United States Patent
Giles

(10) Patent No.: US 7,419,559 B2
(45) Date of Patent: Sep. 2, 2008

(54) METHOD OF MAKING A CLOSURE SEAL FOR A CONTAINER

(75) Inventor: Joseph M. Giles, Secor, IL (US)

(73) Assignee: Selig Sealing Products, Inc., Forrest, IL (US)

( * ) Notice: Subject to any disclaimer, the term of this patent is extended or adjusted under 35 U.S.C. 154(b) by 513 days.

(21) Appl. No.: 11/281,114

(22) Filed: Nov. 17, 2005

(65) Prior Publication Data

US 2006/0068163 A1    Mar. 30, 2006

Related U.S. Application Data

(60) Division of application No. 10/436,512, filed on May 12, 2003, now Pat. No. 6,986,930, which is a continuation-in-part of application No. 10/157,105, filed on May 29, 2002, now Pat. No. 6,635,137, which is a division of application No. 09/693,126, filed on Oct. 20, 2000, now Pat. No. 6,461,714.

(51) Int. Cl.
*B65D 53/00* (2006.01)
*B65D 53/04* (2006.01)

(52) U.S. Cl. .................. 156/226; 156/221; 156/227

(58) Field of Classification Search .......... None
See application file for complete search history.

(56) References Cited

U.S. PATENT DOCUMENTS

| | | | |
|---|---|---|---|
| 4,000,838 A | 1/1977 | Bogert | |
| 5,433,982 A | 7/1995 | Yamada et al. | |
| 5,702,015 A | 12/1997 | Giles et al. | |
| 6,461,714 B1 * | 10/2002 | Giles | 428/126 |

FOREIGN PATENT DOCUMENTS

WO    WO 97/02991    1/1997

* cited by examiner

*Primary Examiner*—Richard Crispino
*Assistant Examiner*—Barbara J. Musser
(74) *Attorney, Agent, or Firm*—Fitch, Even, Tabin & Flannery

(57) ABSTRACT

A seal for a container opening includes a seal layer for connecting to and covering an opening of the container. A pull-tab forming layer is bonded to the seal layer. The pull-tab forming layer has a heat resistant surface joined to the seal layer, and a hinge disposed near the center of the seal. A portion of the pull-tab forming layer defines a pair of opposed pull-tabs extending from the hinge, in which the heat resistant surface covers a top surface of each of the pull-tabs, a surface of the pull-tabs opposite the top surface, and a portion of the pull-tab forming layer facing the surface of the pull-tabs opposite the top surface. A method of forming the seal and a material blank for forming a plurality of the seals are also described.

5 Claims, 4 Drawing Sheets

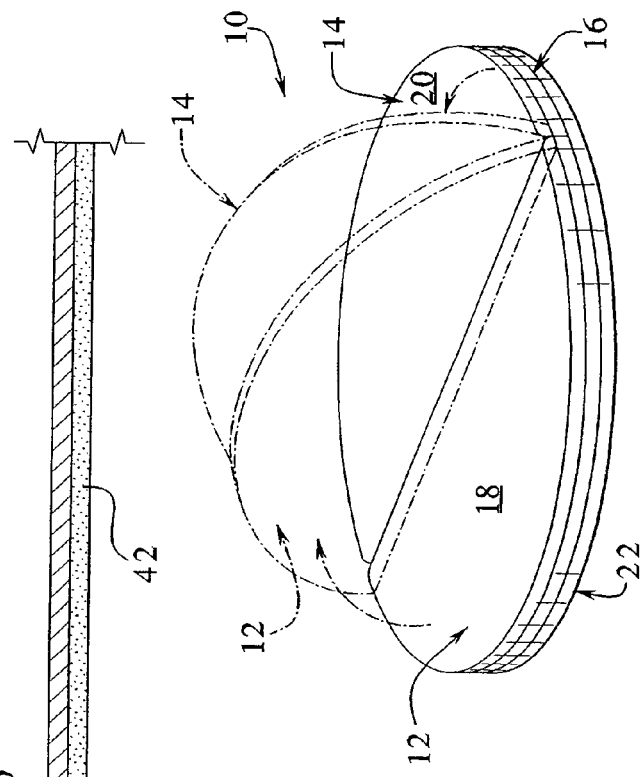
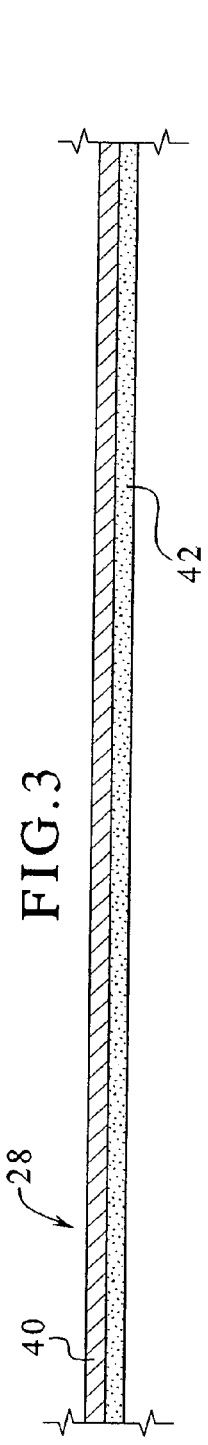
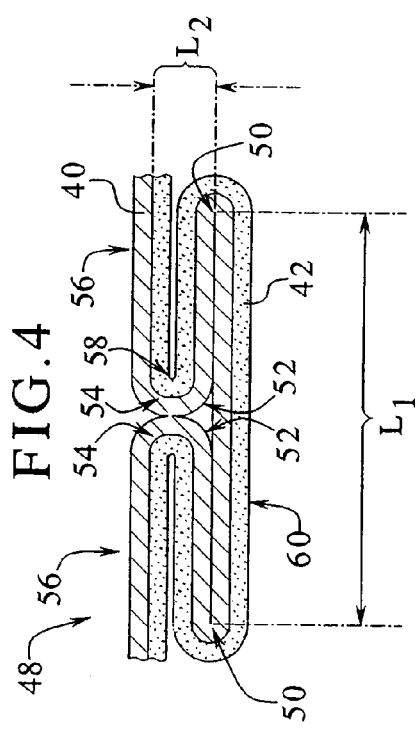
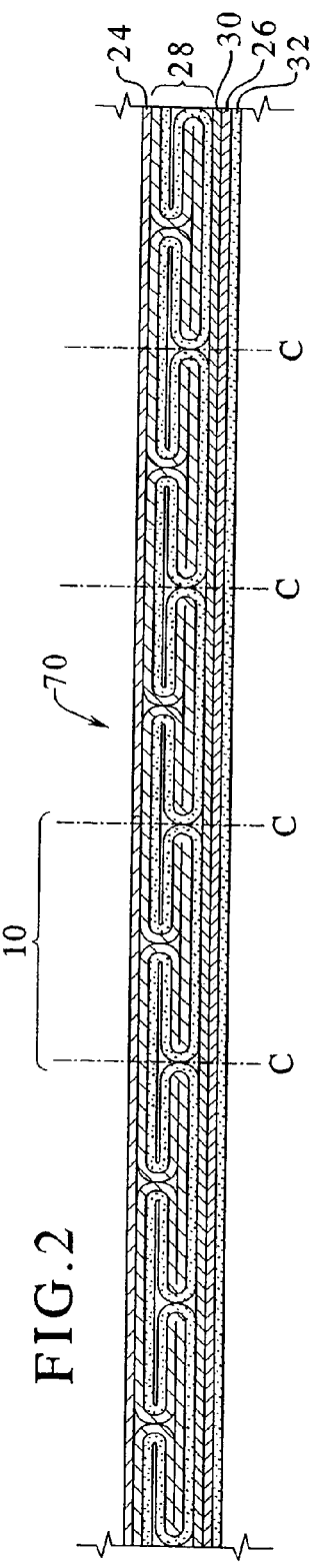

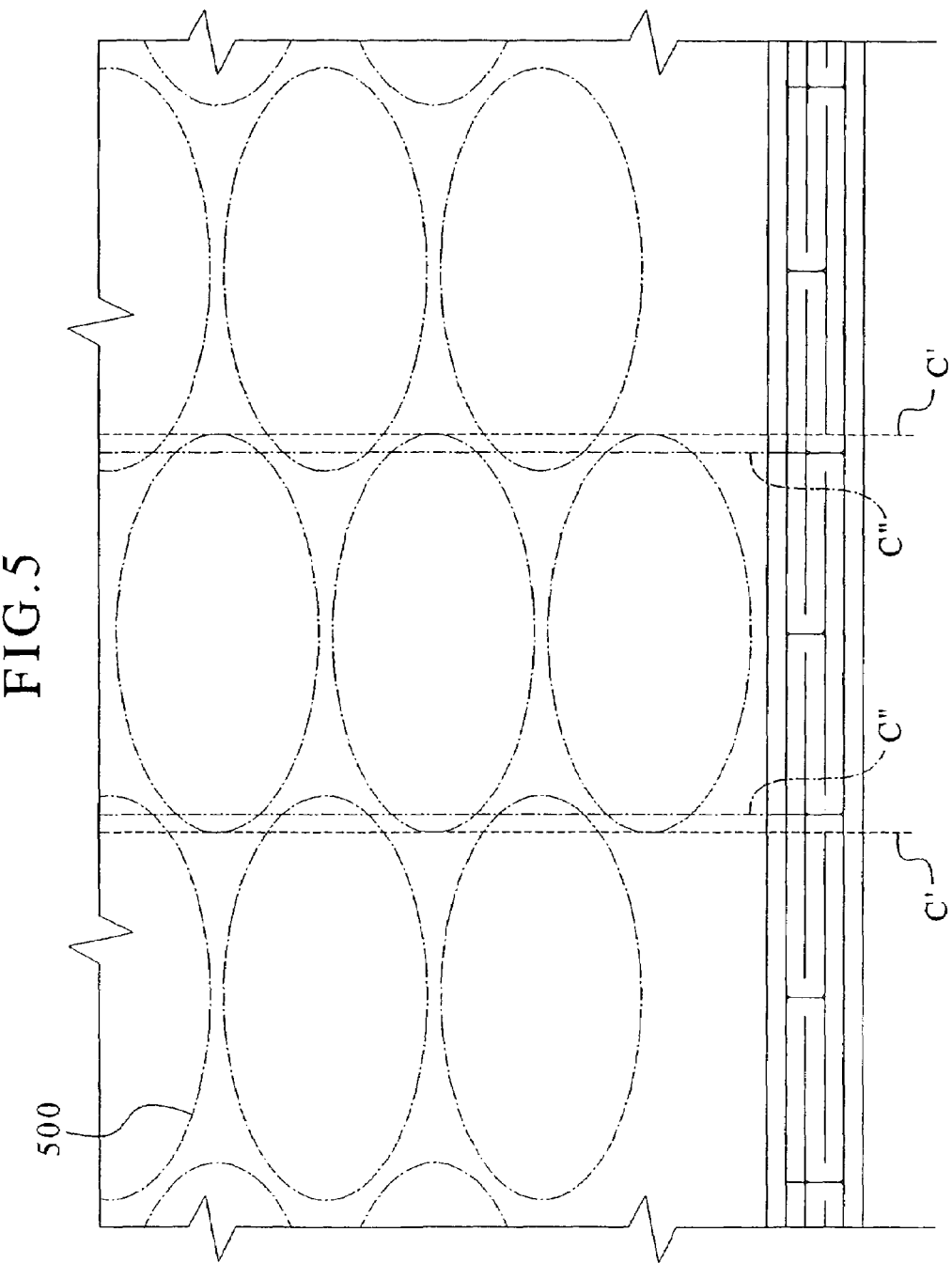

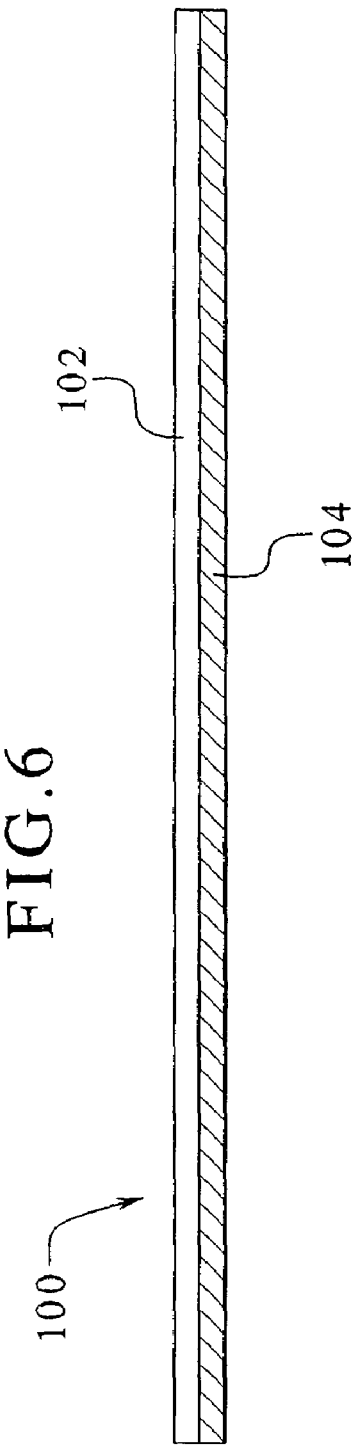
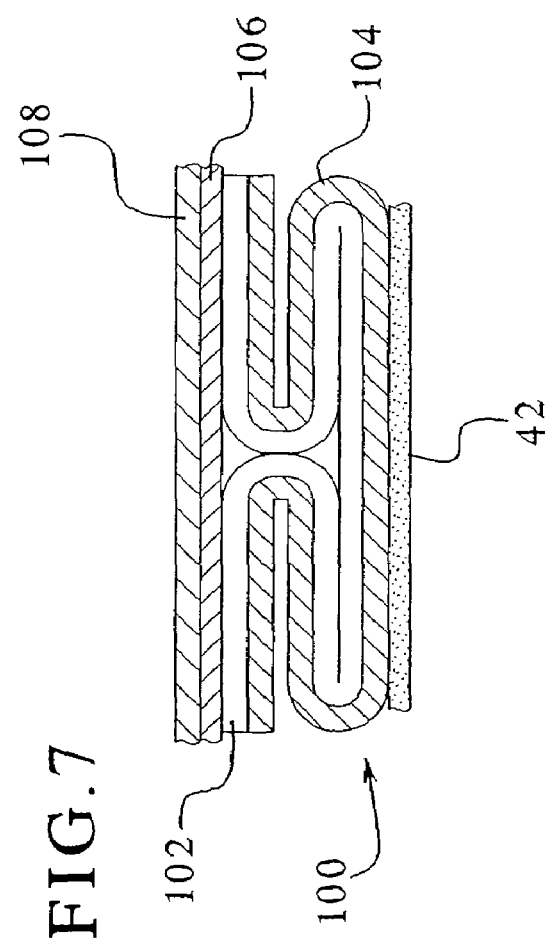

METHOD OF MAKING A CLOSURE SEAL FOR A CONTAINER

RELATED APPLICATION DATA

The present application is a divisional of U.S. application Ser. No. 10/436,512 filed May 12, 2003, now U.S. Pat. No. 6,986,930, which is a continuation-in-part of application Ser. No. 10/157,105, filed May 29, 2002, now U.S. Pat. No. 6,635,137, issued Oct. 21, 2003, which is a divisional of application Ser. No. 09/693,126, filed Oct. 20, 2000, now U.S. Pat. No. 6,461,714, issued Oct. 8, 2002. All of the foregoing applications are incorporated herein by reference to the extent permitted by law.

BACKGROUND OF THE INVENTION

The present invention relates generally to containers having a sealed opening, and more particularly to a closure seal for sealing an opening of a container.

Packaging for certain types of products, and for bottled liquid products in particular, often require a seal that is both peelable (i.e., easy one-piece removal) and leak-proof and that retains the freshness of the contents of the container. Once opened, the freshness seal will be broken. It is, therefore, desirable that the seal be adequately and securely retained over the opening of the container prior to removal. However, it is also highly desirable that the seal be easily removable by the consumer of the product.

Many different types of closure seals are known that adequately perform the peeling, leak prevention and freshness seal objectives. Some of these closure seal designs also incorporate some form of structure or device that assists in removal of the seal. Many simple closure seal designs include a tab extending from a peripheral edge of the seal that can be grasped by a user to remove the closure seal from the container. However, it is often difficult for an individual to grip and hold the tab. Moreover, such a tab also requires special die punch equipment to cut the protruding tab. Yet further, the peripherally extending tab can interfere with good sealing due to the need to accommodate the tab in a cap, e.g., by folding over the tab during capping.

More sophisticated examples of pull-tabs are also known.

For example, U.S. Pat. No. 5,433,992 discloses a seal construction wherein a multi-layer seal is formed with each of the layers adhering to one another. However, a portion of the seal includes a non-adhered section to between two layers. The exposed upper portion of this section of the seal acts as a pull-tab that can be gripped by the user to release the seal from the container.

Selig Sealing Products' own U.S. Pat. No. 5,702,015 discloses a closure seal that also has a pull-tab extending from an upper surface of the seal. The seal disclosed in this patent is formed having a first layer and a second layer of the same material that are co-extruded so as to form a single layer with a portion of the layer forming a pull tab. One advantage of this structure is the elimination of possible environmentally sensitive chemicals used in providing adhesive to secure a second layer to for the pull tab as is down in U.S. Pat. No. 5,433,992.

One problem with many of these closure seals and pull-tabs are that the pull-tabs are thin and difficult to grasp. Formation of a thicker pull-tab would improve the removability characteristics of the closure seal. However, it is desirable not to increase the number of material layers in order to accomplish this objective because of material and manufacturing cost concerns. Another drawback associated with many pull-tab constructions is that, during the manufacturing process, adhesives and/or other bonding techniques must be applied to the sheet or blank of material intermittently over specified areas in order to accomplish formation of the pull-tab. These specific and precise manufacturing techniques add expense to the manufacturing and design processes. A further drawback of many pull-tab designs is that only one pull-tab is available for the consumer to grasp. The pull-tab may be inadvertently partly adhered to another portion of the seal and difficult to initially lift and grasp, or may at least initially be difficult to detect.

SUMMARY OF THE INVENTION

It is, therefore, one object of the present invention to provide a closure seal for an opening of a container that provides a pair of pull-tabs available to assist in removal of the closure seal from the container. It is another object of the present invention to provide a closure seal that, when the pair of pull-tabs are utilized together, provides a thicker gripping surface making removal, one-piece peel removal in particular, of the closure seal easier. It is a further object of the present invention to provide a closure seal that does not require specialized positioning of adhesives or other bonding techniques applied to or performed on the material strip or blank from which the closure seals are fabricated. It is another object of the present, invention to provide a material blank or strip for forming a plurality of the closure seals of the invention. It is a further object of the present invention to provide a method of fabricating closure seals for containers.

These and other objects, features and advantages are provided by the closure seal, the material blank, and the method of fabricating closure seals of the present invention. In one embodiment, a seal for a container opening has a backing layer and a seal layer for connecting to and covering an opening of the container. A pull-tab forming layer is sandwiched between the backing layer and the seal layer. The pull-tab forming layer has a heat sealable side joined to the backing layer and an opposite heat resistant side joined to the seal layer. The pull-tab layer also has a hinge disposed near the center of the seal that joins the backing layer and the seal layer. The backing layer and a portion of the pull-tab forming layer define a pair of opposed pull-tabs extending from the hinge.

In one embodiment, the pull-tab forming layer has a heat sealable sub-layer and a heat resistant sub-layer joined to one another. The pull-tab forming layer is folded to form a central stem from which two pull tabs extend in opposite directions.

In one embodiment, the pull-tab forming layer has a heat sealable sub-layer and a heat resistant sub-layer joined to one another. The pull-tab forming layer is folded to form a central stem from which the pull tabs extend and having an upper horizontal portion with a top surface that defines the heat sealable side of the, pull-tab forming layer. The top surface is formed entirely of exposed, adjoining sections of the heat sealable sub-layer. The stem also has a lower horizontal portion having a bottom surface that defines the heat resistant side of the pull-tab forming layer. The lower horizontal portion is formed entirely of an exposed section of the heat resistant sub-layer.

In one embodiment, the pull-tab forming layer has an upper heat sealable sub-layer joined to a lower heat resistant sub-layer. The pull-tab forming layer is folded to generally form a central stem from which the pull tabs extend and having an upper and lower horizontal portion and a vertical portion extending between the upper and lower horizontal portions. The vertical portion defines the hinge and is arranged so that the upper horizontal portion is joined to the backing layer to define the opposed pair of pull-tabs.

In one embodiment, the pull-tab forming layer has an upper heat sealable sub-layer joined to a lower heat resistant sub-layer. Opposite ends of the pull-tab forming layer are folded about 180° relative to linear section and back onto a first linear section of the pull-tab forming layer so that the opposite ends extend back toward one another. The remaining portions of the opposite end are folded about 90° relative to the linear section so that the heat sealable sub-layer of second linear sections of the opposite ends abut one another. Last remaining portions of the opposite ends are each folded about 90° away from one another so that the last remaining portions beyond the second linear sections extend parallel to and away from one another. The heat sealable sub-layer material of the last remaining portions is joined to the backing layer and the heat resistant sub-layer of the last remaining portions faces the first linear section. The second linear section defines the hinge and the last remaining portions of the opposite ends and the backing layer together define the opposed pair of pull-tabs.

In one embodiment, the backing layer is formed from a thermoset polyester material. In another embodiment, the seal layer is an induction aluminum foil layer.

In one embodiment, the seal layer further includes a bottom surface with a heat activated adhesive carried thereon for attaching the seal to the container.

In one embodiment, the seal layer is joined to the pull-tab forming layer by a bonding material layer such an adhesive system.

In one embodiment, the seal layer is joined to the pull-tab forming layer by an extrusion bonding system.

In one embodiment, the seal layer is joined to the pull-tab forming layer by polyethelene copolymer.

In one embodiment, the seal layer is joined to the pull-tab forming layer by a dry band system.

In one embodiment, the heat sealable side of the pull-tab forming layer is formed from a thermoplastic material such as polyethylene.

In another embodiment, the heat resistant side of the pull-tab forming layer is formed from thermoset polyester.

In one embodiment of the invention, a material blank for forming a plurality of seals for covering container openings includes a backing layer having an upper and a lower surface. The blank also includes a seal layer having an upper and lower surface. The blank further has a pull-tab forming layer having an upper surface joined to the lower surface of the backing layer and having a lower surface joined to the upper surface of the seal layer. The pull-tab forming layer includes a first sub-layer of a heat sealable material with an exposed upper sub-surface and a lower sub-surface. The pull-tab forming layer also has a second sub-layer of a heat resistant material having an exposed lower sub-surface and an upper sub-surface joined to the lower sub-surface of the first sub-layer of material. Each elongate section generally has a central stem in cross section with an upper horizontal portion having a top surface that in combination with the upper horizontal portions of the adjacent sections define the heat sealable side of the pull-tab layer. The top surfaces of the upper horizontal portions are formed entirely by exposed sections of the heat sealable sub-layer.

In one embodiment, the pull-tab forming layer of the material blank has a plurality of vertical hinge portions each extending perpendicularly from the upper horizontal portion of each longitudinal section. Each vertical hinge portion includes two abutting first sub-layers of heat sealable material sandwiched between a pair of second sub-layers of heat resistant material. A lower horizontal portion extends parallel with each of the upper horizontal portions. Each lower horizontal portion has two abutting first sub-layers of heat sealable material substantially surrounded by the second sub-layer of heat resistant material. An air pocket is disposed between the vertical hinge portions and between parts of the upper and lower horizontal portions of each adjacent pair of longitudinal sections.

In one embodiment, a backing layer is a continuous sheet of thermoplastic polyester material. In another embodiment, the seal layer is a continuous sheet of aluminum foil adhered to the bottom surface of the pull-tab forming layer by an adhesive layer completely covering the bottom surface. In a further embodiment, the first sub-layer of heat sealable material is formed from thermoplastic polyethylene and the second sub-layer of heat resistant material is formed from thermoset polyester.

In another embodiment of the invention, a method of forming a plurality of seals for covering container openings includes first providing a backing layer having an upper and a lower surface. The method also includes providing a seal layer also having an upper and lower surface. A lower sub-surface of a first sub-layer of a heat sealable material is then joined with an upper sub-surface of a second sub-layer of a heat resistant material. The joined first and second sub-layers are then folded multiple times to form a plurality of adjacent parallel and elongate sections. Each elongate section generally has a central stem in cross section with an upper horizontal portion, a lower horizontal portion, and a vertical hinge portion. The upper horizontal portions together define a heat sealable top surface of the pull-tab forming layer. The lower horizontal portions together define a heat resistant bottom surface of the pull-tab forming layer. The backing layer is then joined to the pull-tab forming layer by securing the heat sealable top surface of the pull-tab forming layer to the backing layer bottom surface. The seal layer is then joined to the pull-tab forming layer by securing the heat resistant lower surface of the pull-tab forming layer to the seal layer upper surface. A plurality of seal shapes are then punched from the joined layers. However, due to die punch layout nesting, each seal may overlap adjacent elongated sections.

In one embodiment, the step of punching further includes punching a plurality of circular seal shapes from the adhered layers wherein a portion of one of the vertical hinge portions of an elongate section of the adhered layers generally bisects each of the circular seal shapes.

In one embodiment, the step of securing the backing layer to the pull-tab forming layer further includes bonding via an adhesive system, an extrusion system or a thermal lamination system, to secure the upper surface of the pull-tab forming layer to the heat sealable material to the backing layer.

In one embodiment, the step of adhering the seal layer and the pull-tab forming layer further includes applying a bonding material over the entire surface of either the seal layer or the pull-tab forming layer and bonding the two layers together.

In one embodiment, there is provided a seal for a container opening that comprises a seal layer for connecting to and covering an opening of the container. A pull-tab forming layer is bonded to the seal layer, the pull-tab forming layer having a heat resistant surface joined to the seal layer, and a hinge disposed near the center of the seal. A portion of the pull-tab forming layer defines a pair of opposed pull-tabs extending from the hinge, wherein the heat resistant surface covers a top surface of each of the pull-tabs, a surface of the pull-tabs opposite the top surface, and a portion of the pull-tab forming layer facing the surface of the pull-tabs opposite the top surface.

In one embodiment, the pull-tab forming layer further comprises a heat sealable sub-layer and a heat resistant sub-layer joined to one another, wherein the pull-tab forming layer is folded to generally form an I-shape having an upper horizontal portion and a bottom horizontal portion, wherein the heat resistant sub-layer covers top and bottom outer surfaces of the upper horizontal portion and top and bottom outer surfaces of the bottom horizontal portion.

In one embodiment, the pull-tab forming layer further comprises an upper heat sealable sub-layer joined to a lower heat resistant sub-layer, wherein the pull-tab forming layer is folded to generally form an I-shape having an upper horizontal portion, a lower horizontal portion, and a vertical portion extending between the upper and lower horizontal portions, wherein the vertical portion defines the hinge, and wherein the upper horizontal portion is bonded to the seal layer.

In one embodiment, the pull-tab forming layer further comprises: an upper heat sealable sub-layer joined to a lower heat resistant sub-layer, wherein: opposite ends of the pull-tab forming layer are folded about 180° relative to a first linear section of the pull-tab forming layer so that the heat sealable sub-layer of each opposite end is folded onto the heat sealable sub-layer of the first linear section with the opposite ends extending toward one another, the remaining portions of the opposite ends are folded about 90° relative to the first linear section so that the heat sealable sub-layer of a second linear length of each opposite end are spaced apart from one another forming a second linear section, wherein remaining portions of the opposite ends are folded about 90° so that the remaining portions extend away from one another to form a third linear section that is generally parallel to the first linear section, wherein the remaining portions of the opposite ends are folded about 180° relative the third linear section so that the heat sealable sub-layer of each opposite end is folded onto the heat sealable sub-layer of the third linear section with the heat resistant sub-layer material of the last remaining portions joined to the seal layer, the second linear section defines the hinge, and the remaining portions of the opposite ends in the third linear section define the pull-tabs.

In an embodiment, a material blank for forming a plurality of seals for covering container openings is provided. The blank comprises a seal layer having an upper and a lower surface; and a pull-tab forming layer having a lower surface joined to the upper surface of the seal layer, wherein the pull-tab forming layer includes a heat sealable sub-layer and a heat resistant sub-layer joined to one another, the pull-tab forming layer being folded to generally form an I-shape having an upper horizontal portion and a bottom horizontal portion, and the heat resistant sub-layer covering top and bottom outer surfaces of the upper horizontal portion and top and bottom outer surfaces of the bottom horizontal portion, and wherein the heat sealable sub-layer and the heat resistant sub-layer are folded to form an elongated section.

In an embodiment, a method of forming a plurality of seals for covering container openings is provided. The method comprises the steps of: providing a seal layer having an upper surface; joining a lower surface of a heat sealable sub-layer with an upper surface of a heat resistant sub-layer; folding the joined heat sealable and heat resistant sub-layers to form at least one elongate section, the section generally having an I-shaped cross section with an upper horizontal portion, a lower horizontal portion, and a vertical hinge portion between the upper horizontal portion and the lower horizontal portion, the heat resistant sub-layer covering a top surface and a bottom surface of each of the upper and lower horizontal portions; securing the pull-tab forming layer to the seal layer by joining the heat resistant sub-layer at the bottom surface of the lower horizontal portion to the upper surface of the seal layer; and punching a plurality of seals having a shape from the secured layers.

These and other objects, features and advantages of the present invention will become apparent upon a review of the detailed description and accompanying drawing Figures. Particular embodiments of the present invention are disclosed herein only in order to illustrate aspects of the present invention and not in any way to limit the scope of the invention. Changes and modifications can be made to the disclosed embodiments that fall within the scope of the invention.

BRIEF DESCRIPTION OF THE DRAWINGS

FIG. 1 illustrates a perspective view of a closure seal constructed in accordance with one embodiment of the present invention.

FIG. 2 illustrates a cross section of a blank or a strip of material layers including a folded pull-tab forming layer for forming a plurality of the closure seals illustrated in FIG. 1.

FIG. 3 illustrates a cross section of the pull-tab forming layer portion of the closure seal prior to folding.

FIG. 4 illustrates a cross section of one segment of the pull-tab layer after folding in accordance with the present invention.

FIG. 5 illustrates in perspective view, die punch layout nesting on a blank embodying principles of the invention.

FIG. 6 illustrates in cross section a pull tab layer including a foil layer in accordance with further principles of the invention.

FIG. 7 illustrates in cross section a seal incorporating the pull tab layer of FIG. 6.

DETAILED DESCRIPTION OF THE PRESENTLY PREFERRED EMBODIMENTS

Figure 8:
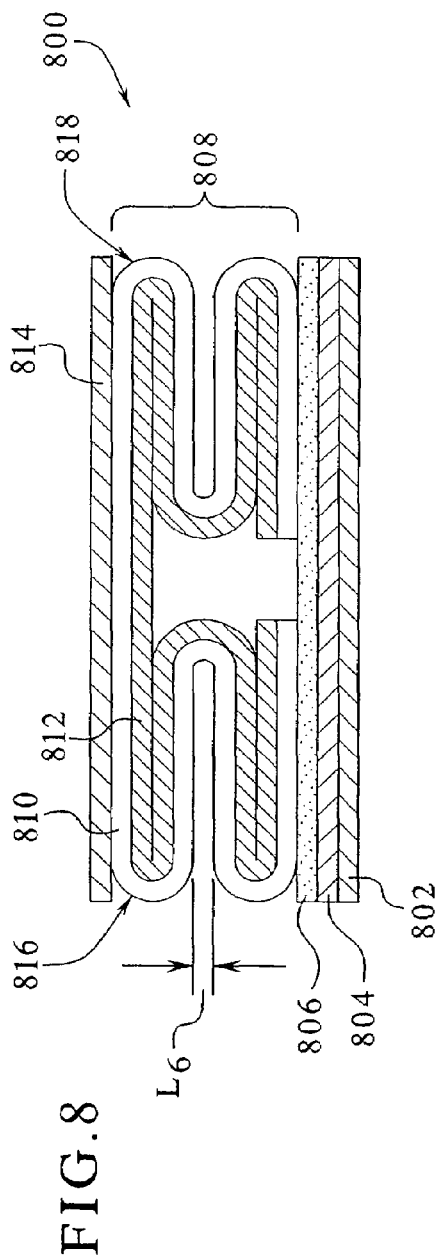
FIG. 8 illustrates in cross section another seal in accordance with methods and devices consistent with the present invention.

Referring now to the drawings, FIG. 1 illustrates a perspective view of a closure seal 10 constructed in accordance with one embodiment of the present invention. The closure seal 10 includes a pair of pull-tabs 12 and 14 opposed to one another and hingedly connected to one another and to a sealing section 16 that can be adhered to an opening of a container. The pull-tabs 12 and 14 each include an upper surface 18 and 20, respectively, that together define a top surface of the closure seal 10. The sealing section 16 includes a bottom surface 22 opposite the top surfaces 18 and 20 of the pull-tabs. The bottom surface 22 faces and is adhered to the container when the closure seal 10 is installed.

FIG. 2 illustrates a cross-section of material layers that form a sheet or web for making the closure seal 10 in order to illustrate the particular construction of the closure seals 10. In general, each seal includes an upper backing layer 24, a lower seal layer 26, and a tab-forming layer 28 sandwiched between the backing and seal layers. A bonding material layer 30 is also disposed between the lower seal layer 26 and the pull-tab forming layer 28 in order to join the two layers together. A second adhesive material layer 32 is provided on the bottom surface of the lower seal layer 26 and defines the bottom surface 22 of the closure seal 10. The adhesive material layer 32 is for adhering the closure seal 10 to the container opening.

Each of the particular layers noted above is described in greater detail below, with the pull-tab forming layer 28 described last.

The upper backing layer 24 can be provided as a thin sheet of material from virtually any suitable heat-resistant material. Examples of such material include thermoset polyester, and the like. The upper backing layer 24 provides an aesthetic appearance as desired, and can include printed messages to portray visual information to a consumer. The upper backing layer 24 provides a continuous integral top surface for the closure seal 10. The upper backing layer 24 is preferably formed from a resilient material that can be provided in sheet form and that will add strength to the pull-tabs 12 and 14.

The lower seal layer 26 provides the seal function of the closure seal 10 and is preferably formed of a metal foil that can be heated by induction to seal the container, although other substances or material, such as a plastic film can be utilized. In one embodiment, the seal lower layer 26 is an aluminum foil sheet typically having a thickness ranging from about 0.0005 to 0.002 inches. An aluminum foil sheet material is also preferred because the lower seal layer 26 provides a seal that is impermeable to liquid and vapor to prevent moisture and germs or other contaminants from effecting contents within the container.

The adhesive layer 32 is provided on the bottom surface of the seal layer 26 to adhere the closure seal 10 to the container opener. The adhesive layer 32 can be a heat activated adhesive, such as an ionomer that softens when heated and then adheres to a surface when cooled. One such ionomer is marketed under the registered trademark SURLYN® and is available from E.I. DuPont DeNemours & Co. The adhesive layer 32 can be heated by induction via the lower seal layer 26 or by some other means to soften and adhere the seal to the container as desired. In an alternative embodiment, the lower seal layer 26 can be designated to remain intact when removed from the container. The adhesive layer 32 can be provided having a weaker bond in order to separate from the container prior to tearing or other damage to the lower seal layer 26. This provides a "clean peel" function whereby the seal 10 is removed without leaving a portion on the container.

The upper surface of the induction or lower seal layer 26 is adhered to the pull-tab forming layer 28 by a bonding layer 30. Again, this bonding layer 30 can be in the form of an adhesive similar to the heat activated material described above for the adhesive layer 32 or some other suitable adhesive. However, the adhesive must provide a strong enough bond so that the pull-tab forming layer 28 does not separate from the induction foil or lower seal layer 26 when the pull-tabs are utilized to remove the closure seal 10 from a container. It is therefore preferable that the bonding layer 30 be a fairly significant adhesive, at least providing a superior bond as compared to the adhesive layer 32 attaching the seal to the container. The bonding layer 30 should sustain the bond between the pull-tab forming layer 28 and lower seal layer 26 beyond when the lower seal layer 26 will tear.

The pull-tab forming layer 28 is comprised of two separate material layers joined to one another in a suitable manner and then folded and heat bonded to retain the shape of the layer. As illustrated in FIG. 3, the pull-tab forming layer 28 begins as a flat sheet or strip of material having an upper heat sealable sub-layer 40 adhered to a lower heat resistant sub-layer 42. The two sub-layers typically must be joined prior to creating the folded formation illustrated in FIG. 4. In one embodiment, the heat sealable sub-layer 40 is formed of a thin thermoplastic material having a thickness in a range of about 0.001 inches. One example of a suitable material is linear low density polyethylene. One example of a suitable heat resistant sub-layer 42 is a thermoset polyester that can withstand temperatures much higher than the heat sealable layer 40 without melting.

The lower seal layer 26 will easily tear when the user pulls on the pull-tabs 12 and 14 in order to open the container. However, the lower seal layer 26 is also durable enough to withstand incidental contact during handling and shipping of the seals and of the sealed containers. The seal layer 26 can indicate tampering because once the seal is broken or the layer is torn, it cannot be repaired or resealed.

FIG. 4 illustrates a portion of the sheet of the pull-tab forming layer 28, defined herein as a folded section 48 after undergoing a multiple folding process to complete the final form of the layer 28.

As best illustrated in FIG. 2, ideally, a plurality of identical folded sections 48 are formed adjacent one another from the unfolded layer 28. Each of the sections 48 defines one strip of the pull-tab forming layer for forming individual closure seals 10. The folded form and the method are described for only one of the sections 48. The form and method is then repeated multiple times in order to create a sheet or web of the pull-tab forming layer 28 for producing multiple closure seals 10 in a grid. However, such a continuous folding method is difficult and the invention preferably, at least initially, is practiced forming single folded strips, i.e., a long strip with one section 48. This is essentially as shown in FIG. 4.

As shown in FIG. 4, a pair of spaced apart folds indicated generally at 50 are created wherein the heat sealable sub-layer 40 is folded onto itself 180° at opposite ends of a segment length $L_1$, so that the material continues back over the length or segment. When the opposing ends of the layer 28 meet at the center of the segment $L_1$, the material is then folded 90° vertically at a pair of second folds 52 so that the heat sealable material is still folded onto itself but extending vertically. A third fold indicated generally at 54 is then created in each segment of the layer 28 wherein the fold is generally 90° and the segments of the layer 28 extend opposed to one another. In this manner, the single section of the layer 28 generally has an I-shaped configuration. The section 48 of the layer 28 includes an upper horizontal segment 56, a vertical segment 58 defined by the length $L_2$, and a lower horizontal segment 60 defined by the length $L_1$. Heat can then be applied to the folded layer 28 so that the folded segments of the heat sealable layer 40 in contact with one another are sealed together. The strip of material is folded multiple times in the same manner to define a plurality of separate parallel sections of the pull-tab forming layer 28. The upper horizontal segments 56 are illustrated integrally connected to adjacent folded sections 48 of the layer 28 until the individual seals 10 are punched or cut out.

As illustrated in FIG. 5, as a practical matter, die punch layouts 500 are nested to minimize waste. Thus, along a given longitudinal direction, the punch outs overlap by the difference between broken lines C' and C'', which represent longitudinally extending tangents to the die punch layouts in adjacent longitudinal rows or columns. However, this does not affect overall form or function of a given seal with the inventive pull tap structure.

In one embodiment, each of the sections 48 can include the identical size and shape to be used in a blank for forming a plurality of identical closure seals 10. Alternatively, one or more of the separate sections of the layer 28 can include various segment sizes to provide sections having different shapes for producing closure seals 10 of different size and/or configuration from the same sheet of material.

The strip or sheet of folded and formed pull-tab forming layer 28 is then further processed to add the backing layer 24.

In one embodiment, the backing layer 24 is secured to the heat sealable side of the layer 28 defined by the adjacent upper horizontal segments 56 by any of various suitable methods including: (1) applying heat to bond the heat sealable sub-layer 40 to itself and to the backing layer 24; (2) an adhesive system; (3) a co-extrusion system, to mention a few. The lower seal layer 26 is adhered to the heat resistant side of the layer 28 defined by the adjacent horizontal segments 60 utilizing the above-described bonding layer 30. The seal adhesive layer 32 is applied to the lower seal layer 26 before or after adhering the lower seal layer 26 to the pull-tab forming layer 28.

FIG. 2 illustrates a portion of a sheet or blank 70 of the folded and adhered material layers that ideally is utilized to produced a plurality of the closure seals 10. Individual seals are cut or punched from the blank in rows and columns depending upon the length of the strip of material and the number of folded sections 48. The cuts would be formed where noted by the lines C in FIG. 2 to separate each of the individual lower horizontal segments 60 of the separate sections of the formed layer 28. The separation would not bisect the continuous upper surface of the formed layer 28 to produce the upper horizontal sections 56 due to the die punch layout nesting mentioned above.

The pull-tabs are not adhered in any way to the seal layer 26, the bonding layer 30 or any other portion of the pull-tab forming layer 28 during any of the adhesion processes or techniques. This is because the heat resistant sub-layer 42 is on the bottom surface of the horizontal segments 56 of each section of the folded layer 28, on the outer side surfaces of the vertical segments 58, and on the bottom and top surfaces of the lower horizontal segments 60. The vertical segments 58 each define a hinge about which the pull-tabs 12 and 14 can move and flex.

Each individual closure seal 10 as illustrated in FIG. 1 is placed on an opening of a bottle or container. Induction heating can be utilized via the induction foil or lower seal layer 26 to bond the closure seal via the adhesive layer 32 to cover the opening of the container. The pull-tabs 12 and 14 are free to move and flex relative to the hinge formed by the vertical segments 58 of the seal. To remove the seal, a user can grasp either one of the pull-tabs 12 or 14 and apply an upward force in order to break the bond of the adhesive 32 or to tear the material layers including the seal layer 26. Alternatively, a consumer can grasp both of the pull-tabs 12 and 14 so that the backing layer 24 on opposite sides of the hinge abut one another. This produces a thicker pull-tab that is easier to grasp for many consumers. The consumer can then pull the combined pull-tabs 12 and 14 to break the seal.

FIG. 1 illustrates a round closure seal 10 for attaching to a container having a round opening into the container. As will be apparent to those skilled in the art, the size, shape and contour of the closure seal can vary considerably depending upon the size, shape and contour of the intended container opening.

FIG. 6 illustrates in cross section a pull tab forming layer 100, similar to the pull tab forming layer 28 of FIG. 3, but comprised of a heat seal layer [102] 104 and a foil layer [104] 102. This structure 100 can provide different and desirable characteristics such as strengthened pull tabs. Further, the foil layer [104] 102 can serve as a means to conduct heat energy in the heat seal layer [102] 104. Essentially, then the foil layer [104] 102 can serve as a heat resistant layer and the means to conduct heat energy to the heat seal layer 104.

FIG. 7 illustrates in cross section a closure incorporating the pull tab forming layer 100 of FIG. 6. This view is similar to that of FIG. 4, except that in addition to the layer pull tab layer 100, the illustration depicts a system, such as an adhesive system 106, for securing a backing layer 108 to the remainder of the closure.

As the entire structure passes through an induction energy field, the foil layer will covert induction energy to heat energy. The heat energy will conduct into the heat seal layer. In turn the heat seal layer will soften and bond to the container.

At the same time, the portion of the foil layer 102 which is folded back against itself, where the pull tabs are formed, will not adhere to itself and therefore will allow the tabbed portion to operate as a hinge.

Referring to FIG. 8, FIG. 8 depicts a cross-sectional view of another closure seal 800 consistent with the present invention. Similar to the closure seal 10 depicted in FIG. 2, the closure seal 800 comprises an adhesive material layer 802, a lower seal layer 804 provided on the adhesive material layer 802, and a bonding material layer 806 provided on the lower seal layer 804.

A pull-tab forming layer 808 is bonded to the bonding material layer 806. The pull-tab forming layer 808 comprises a heat resistant layer 810 and a heat sealable layer 812, which are folded to a shape illustratively depicted in FIG. 8. One having skill in the art will appreciate that the lengths of the segments of the pull-tab forming layer 808 can be different than as illustratively depicted in FIG. 8. A backing layer 814 is provided on the pull-tab forming layer 808.

The various layers depicted in FIG. 8 can comprise materials and provide functionality similar to the similarly-named layers described above with reference to FIGS. 1-7. For example, the heat resistant layer 810 and the heat sealable layer 812 can comprise materials that are the same or similar to the materials described with reference to the heat resistant and heat sealable layers depicted in FIGS. 3 and 6.

Figure 9:
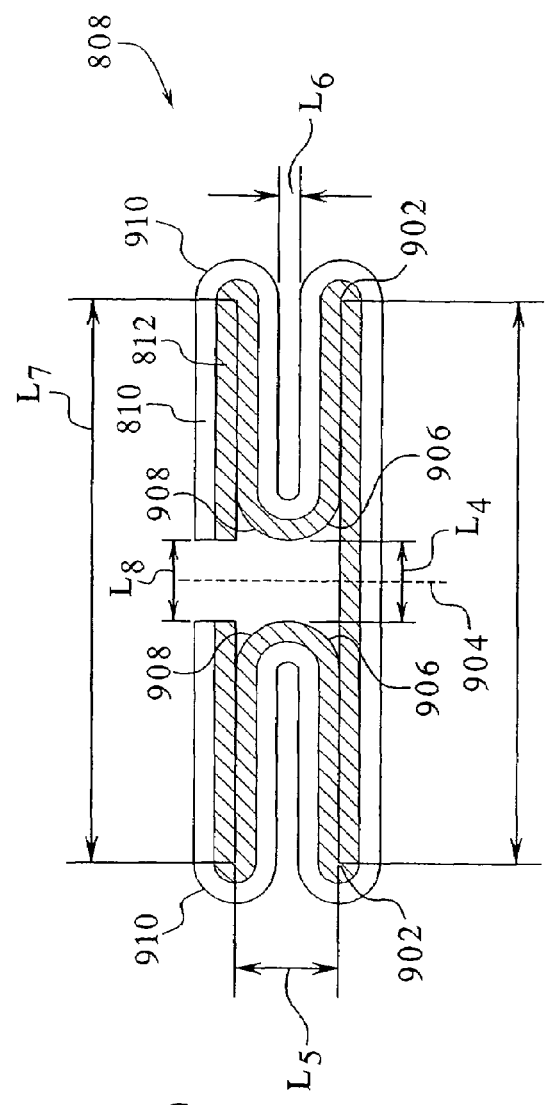
FIG. 9 illustrates a cross section of the pull-tab layer of FIG. 8.

Referring to FIG. 9, to produce the pull-tab forming layer 808, a pair of spaced-apart first folds 902 are created wherein the heat sealable layer 812 and heat resistant layer 810 are folded such that the heat sealable layer 812 is folded onto itself 180° at opposite ends of a segment $L_3$, so that the folded back heat sealable layer 812 and heat resistant layer 810 continue back in a direction of a central point 904 of the segment $L_3$.

Prior to meeting at the central point 904, and spaced apart at a distance $L_4$, the heat sealable layer 812 and heat resistant layer 810 are then folded generally 90° at a pair of second folds 906. Then, the heat sealable layer 812 and heat resistant layer 810 are formed for a distance $L_5$ perpendicular to the segment $L_3$, and folded generally 90° at a third fold 908 in a direction away from the central point 904. The distance $L_5$ is large enough that a distance $L_6$ exists between facing portions of the heat resistant layer 810.

The heat sealable layer 812 and heat resistant layer 810 are then folded 180° at a pair of fourth folds 910 that are spaced apart by a distance $L_7$. Accordingly, the heat sealable layer 812 is folded onto itself along the segment $L_7$. The distance $L_7$ can be the same or different than the distance $L_3$. The portions of the heat sealable layer 812 and the heat resistant layer 810 then terminate at a distance $L_8$, which can be the same or different than the distance $L_4$.

To form the pull-tab forming layer 808, the heat sealable layer 812 and heat resistant layer 810 can preliminarily be of a predetermined length. Alternatively, the heat sealable layer 812 and heat resistant layer 810 can be cut such that the distance $L_8$ is created.

Referring back to FIG. 8, since facing portions of the heat resistant layer 810 are spaced apart by the distance $L_6$, the heat resistant layer 810 does not seal to itself during production. Therefore, a user can pull on first pull-tab portion 816 and the second pull-tab portion 818 of the closure seal 800 without facing portions of the heat resistant layer 810 providing resistance.

Similar to the closure seal 10 described with reference to FIG. 2, a plurality of closure seals 800 can be formed in sheets and punched out or cut, similar to the sheets depicted in FIG. 5.

The above material examples described for fabricating each layer can also vary without departing from the spirit and scope of the present invention. Many other changes and modifications can be made to the described embodiments. These changes and modifications are intended to fall within the scope of the present invention. The described embodiments are provided only to illustrate aspects of the present invention and not intended to limit the scope of the invention. The invention is only to be limited by the scope of the appended claims. Although modifications and changes may be suggested by those skilled in the art, it is the intention of the inventors to embody within the patent warranted hereon all changes and modifications as reasonably and properly come within the scope of their contribution to the art.

What is claimed is:

1. A method of forming a plurality of seals for covering container openings, the method comprising the steps of:
   providing a seal layer having an upper surface;
   joining a lower surface of a heat sealable sub-layer with an upper surface of a heat resistant sub-layer;
   folding the joined heat sealable and heat resistant sub-layers to form at least one elongate section, the section generally having an I-shaped cross section with an upper horizontal portion, a lower horizontal portion, and a vertical hinge portion between the upper horizontal portion and the lower horizontal portion, the heat resistant sub-layer covering a top surface and a bottom surface of each of the upper and lower horizontal portions to form a pull-tab forming layer;
   securing the pull-tab forming layer to the seal layer by joining the heat resistant sub-layer at the bottom surface of the lower horizontal portion to the upper surface of the seal layer; and
   punching a plurality of seals having a shape from the secured layers.

2. The method according to claim 1, further comprising the step of:
   joining a backing layer to the top surface of the upper horizontal portion.

3. The method according to claim 1, wherein the step of securing the seal layer and the pull-tab forming layer further includes applying a bonding layer over either the upper surface of the seal layer or the bottom surface of the lower horizontal portion.

4. The method according to claim 2, wherein the step of joining the backing layer to the pull-tab forming layer comprises dry bonding the layers together.

5. The method according to claim 2, wherein the step of joining the backing layer to the pull-tab forming layer comprises extrusion bonding the layers together.

* * * * *